A. J. CLINE.
PROTECTIVE DEVICE FOR MOTOR CONTROLLERS AND STARTERS.
APPLICATION FILED JAN. 8, 1917.

1,285,625.

Patented Nov. 26, 1918.

UNITED STATES PATENT OFFICE.

ALLAN J. CHASE, OF CHICAGO, ILLINOIS.

PROTECTIVE DEVICE FOR MOTOR CONTROLLERS AND STARTERS.

1,285,625.   Specification of Letters Patent.   Patented Nov. 26, 1918.

Application filed January 2, 1917. Serial No. 140,096.

*To all whom it may concern:*

Be it known that I, ALLAN J. CHASE, a citizen of the United States, and a resident of Chicago, county of Cook, and State of Illinois, have invented certain new and useful Improvements in Protective Devices for Motor Controllers and Starters, of which the following is a specification.

The improvement relates to controllers and starters for electric motors the operation of which is regulated or started and stopped through the medium of an auxiliary or control circuit having one or more control switches located at convenient points or at a distance from the motor and the main motor switch. In such systems of the "remote control type" as they are called, accidental grounding of the control circuit because of worn insulation or for any other reason, may effect the operation of the main switch and thus accidentally start the motor and the apparatus driven thereby.

The present invention seeks to provide a protective or ground detecting device for such auxiliary control circuits which will actuate a protecting circuit breaker in the main motor circuit, or a warning signal, or other means, that will directly or indirectly prevent damage by the accidental grounding of the control circuit, but which otherwise will not interfere with the normal operation of the motor controlling system.

In accordance with the present invention two coils are interposed respectively in the opposite sides of the auxiliary or control circuit adjacent the source of supply therefor, and these coils are so wound that their action upon a coöperating movable armature or member is normally balanced. The coöperating armature or member will thus remain at rest under normal conditions, but if the control circuit is accidentally grounded at any point the action of one of the opposed coils will exceed that of the other and thereby move the armature or protective member. The latter when thus shifted can be arranged to actuate a warning signal or a protective circuit breaker or other suitable means for preventing damage.

The improved protective, ground detecting device can be applied to different kinds of motor controlling and starting systems which employ an auxiliary control circuit. In the accompanying drawing, Figure 1 illustrates diagrammatically the application of the present improvement with two different motor controlling systems.

Figure 1:
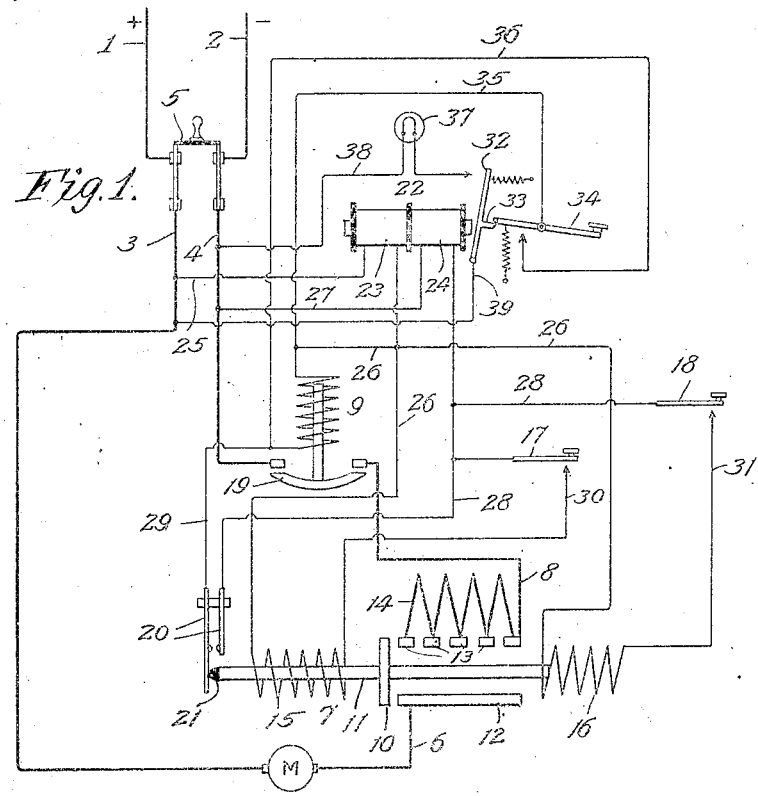

In the arrangement shown in Fig. 1 the main current supply wires 1 and 2 are connected to the conductors 3 and 4 of the motor circuit by a knife switch 5. The motor circuit extends from the knife switch 5 by conductor 3 to the motor, thence by conductor 6 to a speed regulating controller 7, thence by a conductor 8 to an electrically operated switch 9 and by conductor 4 back to the knife switch 5. The speed controller 7 comprises a brush 10 which is mounted upon a reciprocating rod or plunger 11 and coöperates with a contact bar 12 and a series of contacts 13 of a resistance 14. The switch 10 is shifted in opposite directions to open and close the motor circuit at this point and increase or diminish the speed of the motor by suitable electric motive means interposed in an auxiliary or control circuit. In the arrangement shown, a pair of solenoid coils 15 and 16 in the auxiliary or control circuit are arranged to shift the bridging switch 10 of the controller in opposite directions. The operation of the solenoids is effected by means of control switches or push buttons 17 and 18 which can be placed in any location and at any desired distance either from the motor or from the controller 7.

The coil of the electric switch 9 is arranged to shift a bridging switch member 19 and it is also interposed in the auxiliary or control circuit. The circuit through the coil of switch 9 in the arrangement shown, extends through a pair of contacts 20. An insulated stud 21 on the end of the plunger 11 of controller 7 is arranged to engage one of the contacts 20 and hold it open when the controller switch 10 is in open position as shown. When the controller is shifted to close the motor circuit the contacts 20 are engaged and close the circuit of the switch 9 so that the latter is actuated to close the main motor circuit at that point.

The parts thus far described may be widely varied. The auxiliary or control circuit may derive current from an independent source of supply but is preferably connected to the conductors 3 and 4 of the main motor circuit. In accordance with the present invention a protective differential relay 22 having two opposed coils 23 and 24 is interposed in the auxiliary or control circuit at a point adjacent the conductor and 4 or other source of supply, the coils 23 and 24 being interposed respectively in the opposite sides of the control circuit. One of the conductors 25 for the control circuit extends to the coil 23 and thence by a series of branch conductors 26 to the coil of the magnet 9 and the solenoid coils 15 and 16. The other main conductor 27 of the auxiliary or control circuit extends through the coil 24 of the protective differential relay and thence by a series of branch conductors 28 to the switches 17 and 18 and to one of the contacts 20. The other contact 20 is connected to the coil of the switch 9 by a conductor 29 and the contacts of the switches 17 and 18 are connected respectively by conductors 30 and 31 to the solenoid coils 15 and 16.

In the arrangement shown the protective relay is provided with an armature 32 having a finger 33 thereon which engages the insulated end of a spring-held switch 34 and normally holds the latter in open position. This switch and its contact are connected respectively to conductors 35 and 36 which, when the switch is closed, forms a shunt around the coil of the magnet 9. When the armature is shifted, this shunt is closed and the switch 9 is thus prevented from closing or, if closed, is opened. Preferably also, the movement of the armature 32 is arranged to close a circuit through a signal lamp 37 which, in the arrangement shown, is interposed in a conductor 38 that leads from the conductor 4 to the normally open contact of the armature switch 32. The latter is connected to conductor 3 by a conductor 39.

In the normal operation of the controlling system, after the switch 5 is closed to connect the supply conductors 1 and 2 to the conductors 3 and 4 of the motor circuit, the motor may be started by closing the switch 18 so that a current flows from conductor 3 by the conductor 25, the coil 23 of the differential relay, one of the branch conductors 26 to the solenoid coil 16, thence by conductor 31, switch 18, branch conductor 28, the other coil 24 of the differential relay and conductor 27 to the opposite circuit conductor 4. The switch 10 is thus shifted by the solenoid coil 16 to bridge the contacts 12 and 13 and close the contacts 20. When the contacts 20 are closed, the current will flow from conductor 3 by conductor 25, coil 23, one of the branch conductors 26, coil of switch 9, conductor 29, contacts 20, conductor 28, coil 24 and conductor 27 to main conductor 4. The coil of switch 9 is thus energized and bridging switch 19 closed. The switches 19 and 10 thus close the motor circuit and by holding the switch 18 closed, or momentarily closing it from time to time, the switch 10 can be moved along over the contacts 13 to gradually reduce the amount of the resistance 14 in the motor circuit and thereby increase the amount of current flowing in the motor circuit and the speed of the motor. The speed of the motor may also be reduced from time to time if desired or the motor circuit opened by operating the switch 17 which closes the circuit from conductor 3 by conductor 25, coil 23, one of the branch conductors 16, coil 15, conductor 30, switch 17, conductor 28, coil 24 and conductor 27 to the main conductor 4.

The opposed coils 23 and 24 of the differential relay 22 are so wound that their action upon the protective member or armature 32 is normally balanced and since the auxiliary circuit is closed through both of these coils whenever any one of the switches therein is closed, the armature 32 will remain at rest during the normal operation of the controlling system. But if the control circuit is accidentally grounded on either side, the current value applied to one of the coils will exceed that in the opposed coil so that the action of the coils is no longer balanced and the armature 32 will be shifted from the position shown, thereby releasing the switch 34 and closing the circuit of the signal lamp 37. The switch 34, as described, will then close the shunt around the coil of the magnet switch 9, so that the main motor circuit, if closed, is broken at this point or if open, is prevented from closing. With the construction shown, when the armature 32 is shifted to release the switch 34, the latter will remain closed even though the former is restored to normal, and the control system cannot be restored to normal condition until the switch 34 is opened by hand or otherwise. If desired, the safety device or armature 32 may be arranged to operate other means which would prevent damage by the accidental grounding of the control circuit.

Figure 2:
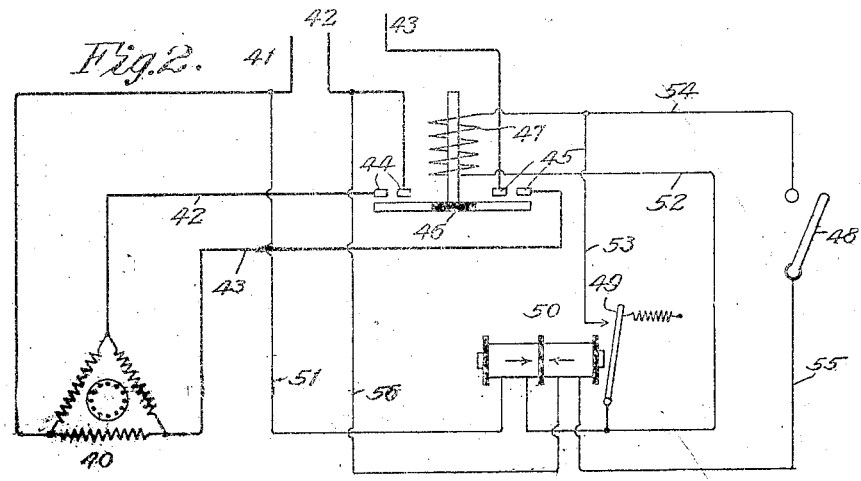

In the arrangement shown in Fig. 2, a three-phase alternating current motor 40 is supplied with current by three phase conductors 41, 42 and 43. The conductor 41 is connected directly to the motor and the conductors 42 and 43 lead respectively through the contacts 44 and 45 of a switch 46. The latter is actuated by a solenoid coil 47 interposed in an auxiliary or control circuit which includes a starting switch 48. When the starting switch is shifted to engage its contact, the circuit is closed from the phase conductor 41 by a conductor 51 through one of the opposed coils of the relay 50, thence by conductor 52, solenoid coil 47, conductor 54, switch 48, conductor 55 through the opposite coil of the relay 50, and thence by the conductor 56 to the phase conductor 42. The coil 47 is thus energized to close the main motor switch 46 but since the coils of the relay 50 are balanced, the armature switch will remain in its normal closed position. A ground on the control circuit will, however, unbalance the coils of the relay 50, actuate the switch 49 and close a shunt through the conductors 53 and 54 around the solenoid coil 47 and thus stop or prevent the accidental starting of the motor.

It is obvious that the details set forth can be widely varied without departure from the essentials of the invention as defined in the claims.

I claim as my invention:

1. The combination with a motor and a main supply circuit therefor, of an electro-magnetic switch in said supply circuit, an auxiliary circuit and a control switch therein for controlling said electro-magnetic switch, a differential relay having normally balanced coils interposed respectively in the opposite sides of said control circuit between the source of supply therefor and said controlled switch, and a protective switch arranged to be actuated by said relay when the coils thereof are unbalanced.

2. The combination with a motor and a motor circuit, of an auxiliary circuit for controlling said motor circuit, one or more control switches in said auxiliary circuit, a ground detector comprising normally balanced coils interposed respectively in the opposite sides of said auxiliary control circuit between the source of supply therefor and said controlled switch or switches, and means arranged to be actuated by said coils when unbalanced for protecting the main motor circuit.

3. The combination with a motor and a motor circuit, of an electro-magnetic switch in said motor circuit, an auxiliary circuit for controlling said electro-magnetic switch, one or more control switches in said auxiliary circuit, a ground detector comprising normally balanced coils interposed respectively in the opposite sides of said auxiliary control circuit adjacent the source of supply therefor, and a signal arranged to be actuated by said coils when unbalanced.

4. The combination with a motor and a main supply circuit therefor, of an electro-magnetic switch in said supply circuit, an auxiliary circuit and a switch therein for controlling said electro-magnetic switch, a protective differential relay having normally balanced coils interposed respectively in the opposite sides of said coil circuit between the source of supply therefor and said control switch, and means controlled by said relay for preventing the operation of said electro-magnetic switch.

5. The combination with a motor and the main supply circuit therefor, of an electro-magnetic switch in said supply circuit, an auxiliary circuit for operating said electro-magnetic switch to open and close said main supply circuit, one or more control switches in said auxiliary circuit, a protective differential relay having normally balanced coils interposed respectively in the opposite sides of said control circuit adjacent the source of supply therefor, and means actuated by said relay when the coils thereof are unbalanced for preventing the closing of said electro-magnetic switch.

ALLAN J. CLINE.